(12) United States Patent
Schmehl et al.

(10) Patent No.: US 9,085,109 B2
(45) Date of Patent: Jul. 21, 2015

(54) THREE-DIMENSIONAL PRINTER TOOL SYSTEMS

(71) Applicant: MakerBot Industries, LLC, Brooklyn, NY (US)

(72) Inventors: Peter Joseph Schmehl, New York, NY (US); Aljosa Kemperle, Brooklyn, NY (US); Stewart Schmehl, Pinehurst, NC (US); David R. Tuzman, Menlo Park, CA (US)

(73) Assignee: MakerBot Industries, LLC, Brooklyn, NY (US)

( * ) Notice: Subject to any disclaimer, the term of this patent is extended or adjusted under 35 U.S.C. 154(b) by 42 days.

(21) Appl. No.: 14/081,922

(22) Filed: Nov. 15, 2013

(65) Prior Publication Data

US 2015/0140145 A1    May 21, 2015

(51) Int. Cl.

| | | |
|---|---|---|
| *B28B 1/14* | (2006.01) | |
| *B29C 35/08* | (2006.01) | |
| *B29C 41/02* | (2006.01) | |
| *B29C 67/00* | (2006.01) | |
| *B29C 47/06* | (2006.01) | |
| *B33Y 30/00* | (2015.01) | |
| *B29L 9/00* | (2006.01) | |

(52) U.S. Cl.
CPC ........... *B29C 67/0055* (2013.01); *B29C 47/065* (2013.01); *B29L 2009/00* (2013.01); *B33Y 30/00* (2014.12)

(58) Field of Classification Search
CPC .. B29C 67/0055; B29C 67/008; B29C 47/06; B29C 47/0801; B29C 47/0805; B29C 47/082; B29C 47/0866; B33Y 30/00; B29L 2009/0053

USPC ............ 425/131.1, 174, 375, 447, 449, 174.4
See application file for complete search history.

(56) References Cited

U.S. PATENT DOCUMENTS

| | | | |
|---|---|---|---|
| 5,836,068 | A | 11/1998 | Bullen et al. |
| 6,129,872 | A | 10/2000 | Jang |
| 6,238,613 | B1 | 5/2001 | Batchelder et al. |
| 6,749,414 | B1 | 6/2004 | Hanson et al. |

(Continued)

FOREIGN PATENT DOCUMENTS

CN       103112166       5/2013

OTHER PUBLICATIONS

"E4 Hyrel 3D Printer", www.hyrel3d.com/e4/, Sep. 9, 2013, 8 Pages.

(Continued)

*Primary Examiner* — Joseph S Del Sole
*Assistant Examiner* — Thukhanh T Nguyen
(74) *Attorney, Agent, or Firm* — Strategic Patents, P.C.

(57) ABSTRACT

An extruder or other similar tool head of a three-dimensional printer is slidably mounted along a feedpath of build material so that the extruder can move into and out of contact with a build surface according to whether build material is being extruded. The extruder may be spring-biased against the forward feedpath so that the extruder remains above the build surface in the absence of applied forces, and then moves downward into a position for extrusion when build material is fed into the extruder. In another aspect, modular tool heads are disclosed that can be automatically coupled to and removed from the three-dimensional printer by a suitable robotics system. A tool crib may be provided to store multiple tool heads while not in use.

23 Claims, 7 Drawing Sheets

(56) References Cited

U.S. PATENT DOCUMENTS

| | | |
|---|---|---|
| 7,625,198 B2 | 12/2009 | Lipson et al. |
| 7,625,200 B2 | 12/2009 | Leavitt |
| 7,896,209 B2 | 3/2011 | Batchelder et al. |
| 7,897,074 B2 | 3/2011 | Batchelder et al. |
| 8,287,959 B2 | 10/2012 | Batchelder |
| 8,419,996 B2 | 4/2013 | Swanson et al. |
| 8,647,102 B2 | 2/2014 | Swanson et al. |
| 8,663,533 B2 | 3/2014 | Swanson et al. |
| 2007/0228590 A1 | 10/2007 | LaBossiere et al. |
| 2012/0162305 A1 | 6/2012 | Swanson et al. |
| 2013/0089642 A1 | 4/2013 | Lipson et al. |
| 2013/0209600 A1 | 8/2013 | Tow |
| 2013/0234366 A1 | 9/2013 | Batchelder et al. |
| 2014/0050811 A1 | 2/2014 | Lipton et al. |

OTHER PUBLICATIONS

Benchoff, Brian, "Automatic Tool Changing on a 3D Printer", hackaday.com/2013/09/17/automatic-tool-changing-on-a-3d-printer/, Sep. 17, 2013, 9 Pages.

"Hyrel 3D Printer System 30", http://www.3ders.org/articles/20131101-introducing-hyrel-3d-new-powerful-3d-printer-system-30.html, Nov. 1, 2013, 7 pages.

"U.S. Appl. No. 14/580,377, Non-Final Office Action mailed Apr. 10, 2015", 7 pages.

"U.S. International Searching Authority, International Application Serial No. PCT/US14/64813, Search Report and Written Opinion mailed Mar. 25, 2015", 10 pages.

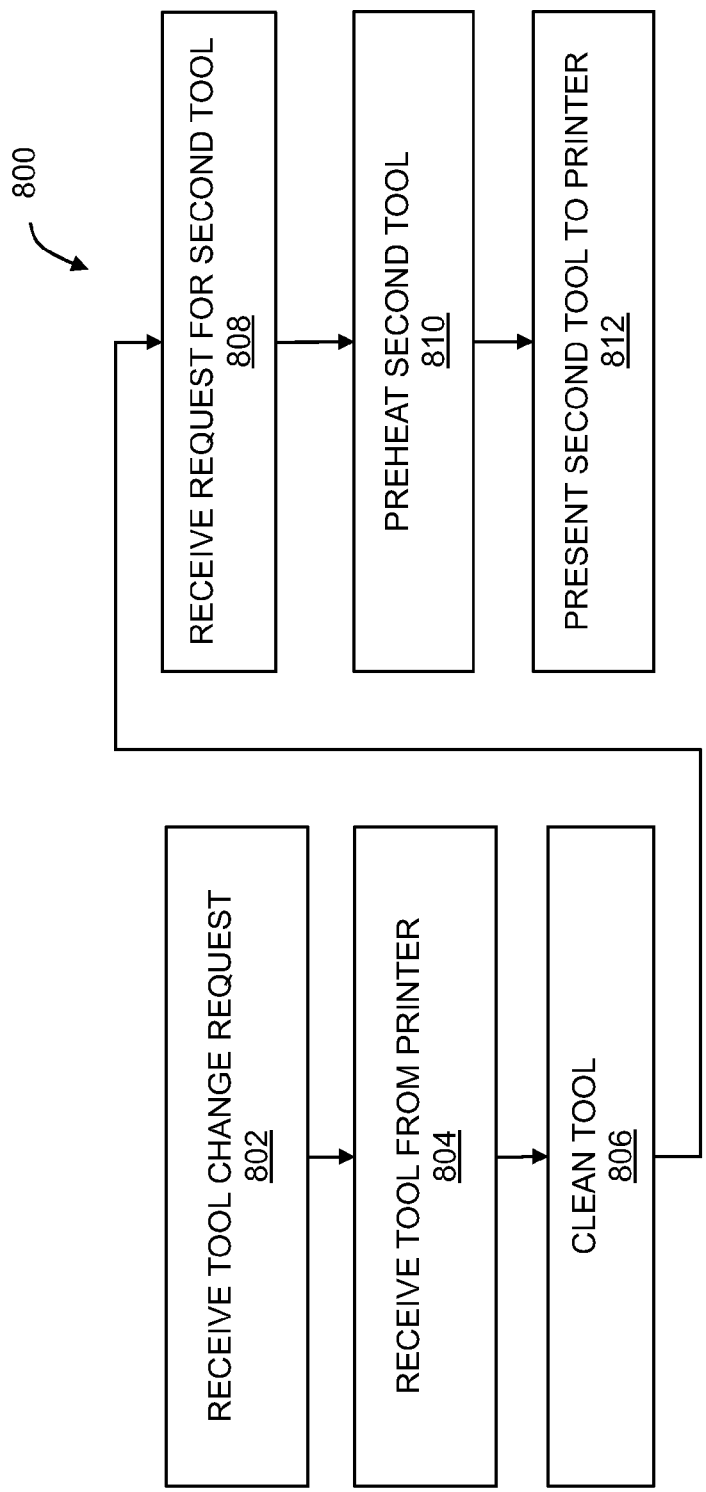

THREE-DIMENSIONAL PRINTER TOOL SYSTEMS

BACKGROUND

There remains a need for improved printing tools for use in three-dimensional printers.

SUMMARY

An extruder or other similar tool head of a three-dimensional printer is slidably mounted along a feedpath of build material so that the extruder can move into and out of contact with a build surface according to whether build material is being extruded. The extruder may be spring-biased against the forward feedpath so that the extruder remains above the build surface in the absence of applied forces, and then moves downward into a position for extrusion when build material is fed into the extruder.

In another aspect, modular tool heads are disclosed that can be automatically coupled to and removed from the three-dimensional printer by a suitable robotics system. A tool crib may be provided to store multiple tool heads while not in use, and the tool crib may be configured for various administrative tasks such as detecting the presence and type of tool in each bin, or various printing tasks such as pre-heating tools prior to use or cleaning tools after use. The three-dimensional printer may also be advantageously configured to automatically change tools when an error condition such as a clogged extruder is detected, or under other circumstances where conditions indicate that a change in tool is necessary or helpful.

BRIEF DESCRIPTION OF THE FIGURES

The invention and the following detailed description of certain embodiments thereof may be understood by reference to the following figures:

FIG. 8 shows a method for operating a tool crib.

DETAILED DESCRIPTION

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus the term "or" should generally be understood to mean "and/or" and so forth.

The following description emphasizes three-dimensional printers using fused deposition modeling or similar techniques where a bead of material is extruded in a layered series of two dimensional patterns as "roads," "paths" or the like to form a three-dimensional object from a digital model. It will be understood, however, that numerous additive fabrication techniques are known in the art including without limitation multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer", "three-dimensional printer", "fabrication system", and so forth, unless a more specific meaning is explicitly provided or otherwise clear from the context.

Figure 1:
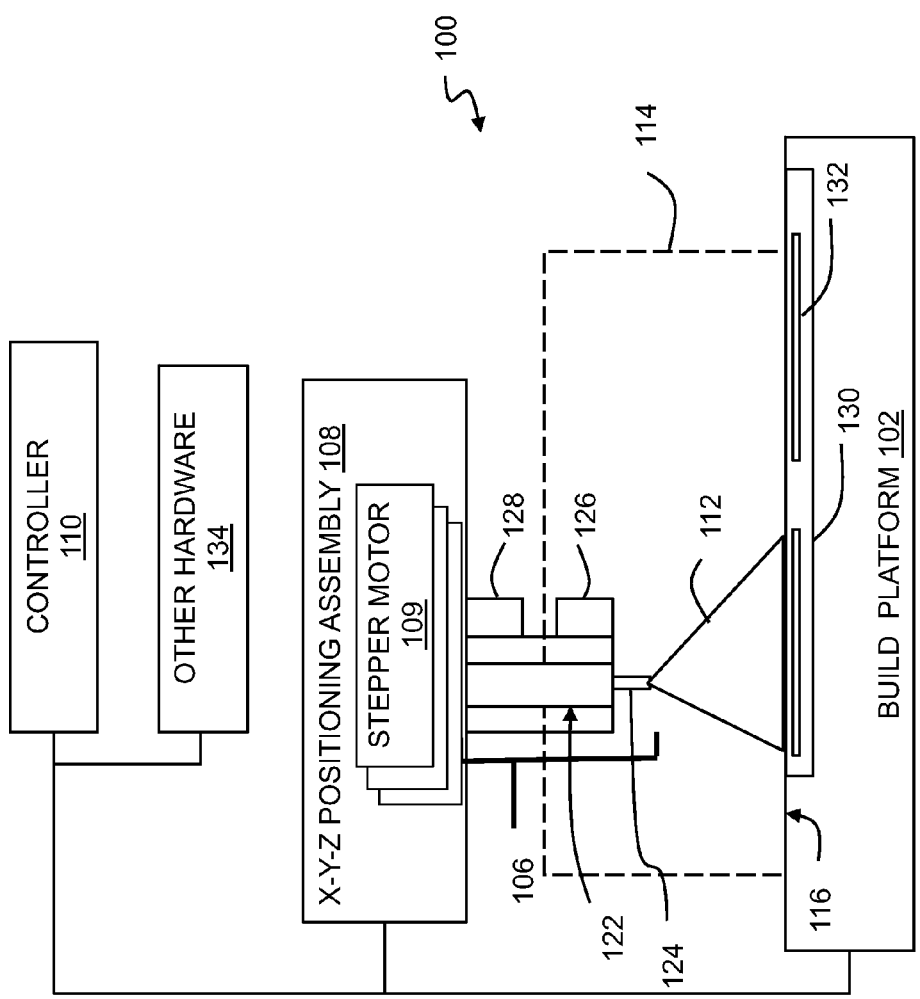
FIG. 1 is a block diagram of a three-dimensional printer.

FIG. 1 is a block diagram of a three-dimensional printer. In general, the printer 100 may include a build platform 102, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may provide a fixed, dimensionally and positionally stable platform on which to build the object 112. The build platform 102 may include a thermal element 130 that controls the temperature of the build platform 102 through one or more active devices 132, such as resistive elements that convert electrical current into heat, Peltier effect devices that can create a heating or cooling affect, or any other thermoelectric heating and/or cooling devices. The thermal element 130 may be coupled in a communicating relationship with the controller 110 in order for the controller 110 to controllably impart heat to or remove heat from the surface 116 of the build platform 102.

The extruder 106 may include a chamber 122 in an interior thereof to receive a build material. The build material may, for example, include acrylonitrile butadiene styrene ("ABS"), high-density polyethylene ("HDPL"), polylactic acid ("PLA"), or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 (also referred to as a heating element) to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heating elements suitable for creating heat within the chamber 122 sufficient to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure.

The x-y-z positioning assembly 108 may generally be adapted to three-dimensionally position the extruder 106 and the extrusion tip 124 within the working volume 114. Thus by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to independently control a position of the extruder 106 within the working volume along each of an x-axis, a y-axis, and a z-axis. More generally, the x-y-z positioning assembly 108 may include without limitation various combinations of stepper motors, encoded DC motors, gears, belts, pulleys, worm gears, threads, and so forth. For example, in one aspect the build platform 102 may be coupled to one or more threaded rods by a threaded nut so that the threaded rods can be rotated to provide z-axis positioning of the build platform 102 relative to the extruder 124. This arrangement may advantageously simplify design and improve accuracy by permitting an x-y positioning mechanism for the extruder 124 to be fixed relative to a build volume. Any such arrangement suitable for controllably positioning the extruder 106 within the working volume 114 may be adapted to use with the printer 100 described herein.

In general, this may include moving the extruder 106, or moving the build platform 102, or some combination of these. Thus it will be appreciated that any reference to moving an extruder relative to a build platform, working volume, or object, is intended to include movement of the extruder or movement of the build platform, or both, unless a more specific meaning is explicitly provided or otherwise clear from the context. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically or otherwise coupled in a communicating relationship with the build platform 102, the x-y-z positioning assembly 108, and the other various components of the printer 100. In general, the controller 110 is operable to control the components of the printer 100, such as the build platform 102, the x-y-z positioning assembly 108, and any other components of the printer 100 described herein to fabricate the object 112 from the build material. The controller 110 may include any combination of software and/or processing circuitry suitable for controlling the various components of the printer 100 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the printer 100 such as an on-board processor. In another aspect, this may be a processor associated with a personal computer or other computing device coupled to the printer 100, e.g., through a wired or wireless connection. Similarly, various functions described herein may be allocated between an on-board processor for the printer 100 and a separate computer. All such computing devices and environments are intended to fall within the meaning of the term "controller" or "processor" as used herein, unless a different meaning is explicitly provided or otherwise clear from the context.

A variety of additional sensors and other components may be usefully incorporated into the printer 100 described above. These other components are generically depicted as other hardware 134 in FIG. 1, for which the positioning and mechanical/electrical interconnections with other elements of the printer 100 will be readily understood and appreciated by one of ordinary skill in the art. The other hardware 134 may include a temperature sensor positioned to sense a temperature of the surface of the build platform 102, the extruder 126, or any other system components. This may, for example, include a thermistor or the like embedded within or attached below the surface of the build platform 102. This may also or instead include an infrared detector or the like directed at the surface 116 of the build platform 102.

In another aspect, the other hardware 134 may include a sensor to detect a presence of the object 112 at a predetermined location. This may include an optical detector arranged in a beam-breaking configuration to sense the presence of the object 112 at a predetermined location. This may also or instead include an imaging device and image processing circuitry to capture an image of the working volume and to analyze the image to evaluate a position of the object 112. This sensor may be used for example to ensure that the object 112 is removed from the build platform 102 prior to beginning a new build on the working surface 116. Thus the sensor may be used to determine whether an object is present that should not be, or to detect when an object is absent. The feedback from this sensor may be used by the controller 110 to issue processing interrupts or otherwise control operation of the printer 100.

The other hardware 134 may also or instead include a heating element (instead of or in addition to the thermal element 130) to heat the working volume such as a radiant heater or forced hot air heater to maintain the object 112 at a fixed, elevated temperature throughout a build, or the other hardware 134 may include a cooling element to cool the working volume.

Figure 2:
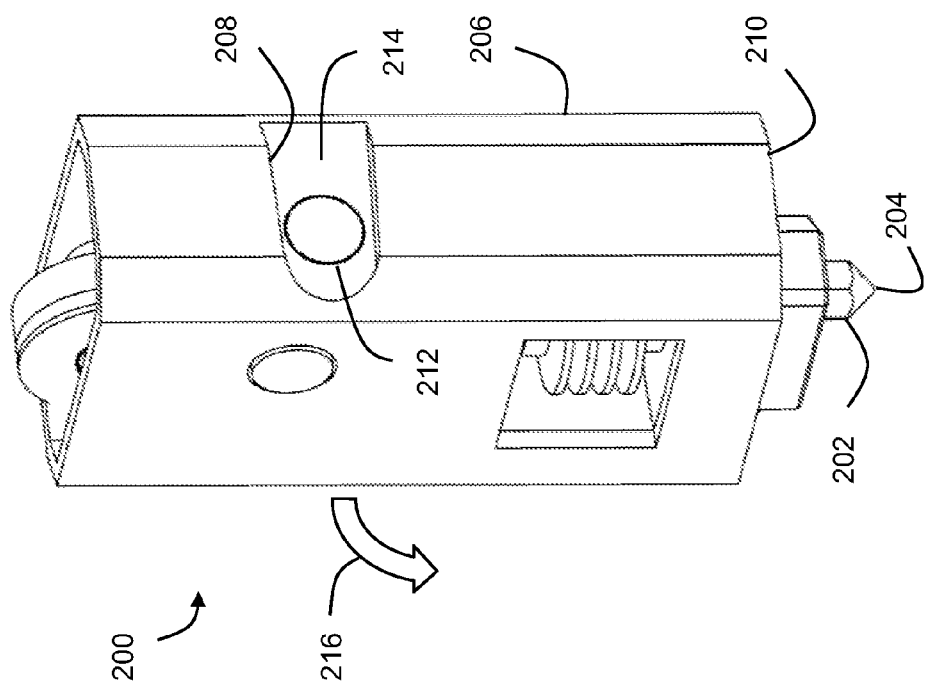
FIG. 2 shows a perspective view of an extruder.

FIG. 2 shows a perspective view of an extruder. The extruder 200 may be a modular extruder that can be removably and replaceably coupled to a three-dimensional printer such as any of the printers described above. Although various specific mechanical features are described below for modular operation, it will be understood that any features or techniques that can be used to securely couple the extruder 200 to the three-dimensional printer in a manner capable of resisting displacement by extrusion-related forces, while being readily removed and replaced, e.g., by a corresponding robotics system, may be suitably employed in the housing and other components of the extruder 200.

The extruder 200 may include an extrusion head 202 with a nozzle 204 that extrudes a build material such as any of the build materials described above. In general, the extrusion head 202 may be slidably coupled within a housing 206 to slide parallel to an axis of a feedpath through the housing 206, not illustrated in this figure but generally running vertically from a top of the housing 206 through the nozzle 204 of the extruder 200. In general, the extrusion head 202 may be aligned to the axis of the feedpath when the extrusion head 202 (and housing 206) is placed for use in the three-dimensional printer.

The housing 206 may rest about the feedpath and fully or partially enclose the feedpath as well as a portion of a drive assembly (not shown). As noted above, the housing 206 may be coupled to the extrusion head 202 in a manner that permits the extrusion head 202 to slide within the housing 206. This general feature may be accomplished in a number of ways. For example, the housing 206 may be coupled in a fixed relationship to the drive assembly and configured for the extrusion head to move within the housing relative to the drive assembly. In another aspect, the housing may be coupled in a fixed relationship to the extrusion head 202 and configured for the drive assembly to move within the housing (or alternatively stated, for the entire housing to slidably move relative to the drive assembly). As with the extrusion head 202, the housing 206 may align to the axis of the feedpath when the housing 206 is placed for use in a three-dimensional printer. A variety of registration features may be included to provide this alignment such as notches, protrusions, or other mechanical keying features. The housing 206 may also or instead include a surface such as the first surface 208 or the second surface 210 that are load bearing surfaces to support the extrusion head 202 against displacement along the axis of the feedpath (other than the intended linear displacement within a predetermined range) under a force applied by a build material along the feedpath. These surfaces may generally be horizontal or otherwise configured to resist horizontal displacement, such as with the two opposing, concave surfaces on each side of the housing 206 visible in FIG. 3.

The housing 206 may also include one or more magnets 212 disposed on a vertical surface 214 to magnetically couple to a corresponding vertical wall of a three-dimensional printer (with correspondingly positioned magnets or magnetic material). In this configuration, the one or more magnets 212 can resist rotational displacement (as indicated by an arrow 216) of the housing 206 when placed in the three-dimensional printer. In this manner, magnetic forces may be used to retain the housing 206 rotationally within a fixture of a three-dimensional printer against relatively weak forces of rotation, thus permitting the housing 206 to be rotated into and out of engagement with the three-dimensional printer by a robotics system. At the same time, surfaces 208, 210 of the housing may provide load-bearing support against displacement of the housing 206 and/or extrusion head 202 by extrusion forces during a three-dimensional fabrication process. The one or more magnets 212 may be fixed magnets and/or electromagnets that can be electronically activated and deactivated to secure the housing 206 as desired.

In general, the housing 206 may be configured to removably and replaceably couple to a three-dimensional printer in a predetermined alignment. This may include a predetermined alignment to a drive assembly of the three-dimensional printer, e.g., to couple the drive assembly of the three-dimensional printer to a complementary drive assembly within the housing 206. This may also or instead include a predetermined alignment to an axis of a feedpath for a filament of build material driven by the drive assembly.

Figure 3:
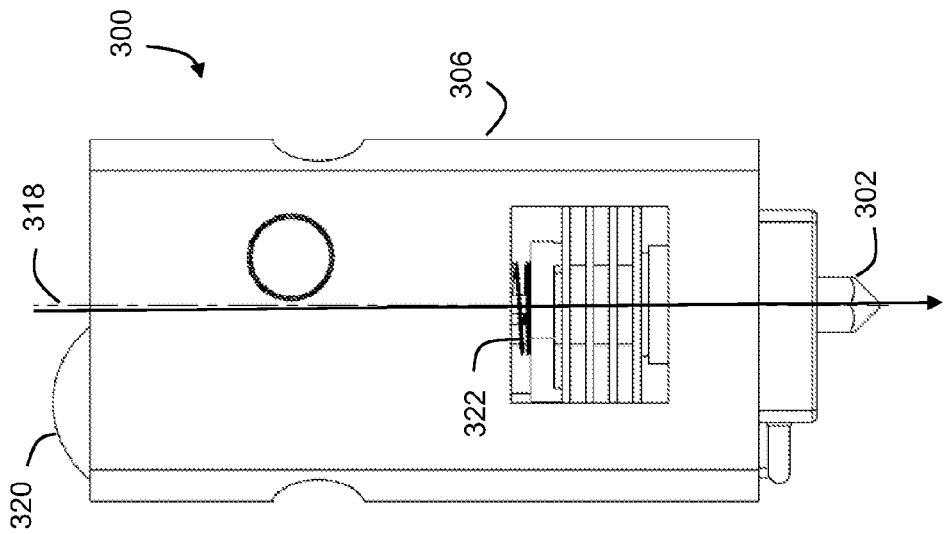
FIG. 3 shows a side view of an extruder.

FIG. 3 shows a side view of an extruder. The extruder 300 may be a modular extruder such as any of the modular extruders described above. The axis 318 of the feedpath is illustrated superimposed on the housing 306 with a downward arrowhead generally indicating the forward direction of the feedpath. A roller 320 or similar mechanism may be provided within the housing 306 to direct a filament of build material into the housing 306 and along the axis 318 of the feedpath.

A spring 322 such as a coil spring or the like may be included within the housing 306 coupling the extrusion head 302 to a drive assembly (not shown). It will be appreciated that this may be a direct coupling, e.g., where the spring is directly attached to the extrusion head 302 and/or drive assembly, or this may be an indirect coupling through other mechanical components, structural components, the housing 306, and so forth.

The spring 322 generally serves to bias the extrusion head 302 against the forward feedpath so that the extrusion head 302 lifts up toward the drive assembly in the absence of external forces, and yields to permit the extrusion head 302 to move down toward a build surface (forward in the feedpath) a predetermined distance when an extrusion force is applied by the drive assembly to a filament in the feedpath. In this manner, the extrusion head 302 may move up and down as driving forces are applied and released from build material. This configuration advantageously lifts the extrusion head 302 up and away from an object being fabricated when extrusion is stopped, thereby mitigating dripping, leakage, smearing, and the like of liquefied build material. As a further advantage, this separation of the extrusion head 302 from an object may occur automatically due to the spring mechanism and in proportion to the forces applied by the drive assembly, without any need for additional control circuitry or programming of a three-dimensional printer. In another aspect, the spring may be omitted, and forces applied by the build material along the feedpath may be used to move the extrusion head 302 forward and backward (e.g., up and down) along the feedpath between a deployed (down) position and an undeployed (up) position. In this latter embodiment, a reverse movement by a drive motor may be used to pull a filament backward along the feedpath and retract the extrusion head 302 up and away from a surface or object that is being fabricated.

The spring 322 may be any suitable type of spring, and may be coupled in a variety of ways to the extrusion head 302, housing 306, and drive assembly. For example, the spring 322 may be a coil spring wound about the feedpath (i.e., the axis 318 of the feedpath), or the spring 322 may be offset from the axis 318 of the feedpath and coupled outside the feedpath between the extrusion head 302 and the drive assembly. The spring 322 may be coupled directly or indirectly between the extrusion head and the drive assembly, with the spring 322 biasing the extrusion head toward the drive assembly with a predetermined spring force. The spring 322 may also or instead couple the extrusion head 302 to a drive gear of the drive assembly with a predetermined spring force through the housing 306 or other internal components thereof.

The predetermined spring force may, for example, be less than a force applied by a filament to the extrusion head 302 to extrude the filament from the extrusion head 302, so that the spring can yield to permit downward movement (forward in the feedpath) of the extrusion head 302 when extrusion forces are applied. The spring 322 may also or instead be responsive to an applied force of a filament from a drive gear of the drive assembly to move the extrusion head 302 into an extruding position having a greater distance between the drive gear and the extrusion head 302, that is, forward along the feedpath or downward in FIG. 3. The spring 322 may also or instead be responsive to a removal of the applied force to move into a retracted position having a smaller distance between the drive gear and the extrusion head 302.

The spring 322 may in general have any suitable predetermined spring force. For example, the predetermined spring force may be a force that retains the extrusion head 302 proximal to the drive gear (in the "retracted position" described above) in the absence of an applied force from a filament driven by the drive gear, and the predetermined spring force may permit that extrusion head 302 to move away from the drive gear when the applied force of build material from the drive gear exceeds a predetermined threshold, such as a force less than the force required to extrude the filament through the nozzle of the extrusion head 302. In one aspect, the spring 322 may have a spring constant of about 0.2 pounds, or about a sufficient spring force to support the weight of the extrusion head 302 and associated hardware in an elevated position (e.g., closest to the drive assembly) in the absence of external forces when placed for use with an axis of the feedpath through the housing 306 and the extrusion head 302 substantially parallel to a gravitational force on the extrusion head 302.

In other embodiments, the spring 322 may be usefully configured to bias the extrusion head 302 away from the drive assembly (i.e., downward toward a build platform when placed for use) with any suitable spring force. This spring 322 may be used in combination other springs and or actuators providing contrary forces to achieve any suitable response or bias to the extrusion head 302. For example, the spring 322 may bias the extrusion head 302 away from the drive assembly with a predetermined spring force so that the extrusion head 302 generally rests in a downward position. During an extrusion process, the tension of build material along the feedpath may be used to lift the extrusion head 302 away from an object, build platform or other surface, e.g., by incrementally reversing a drive gear or the like, in between lengths of extruded material.

Figure 4:
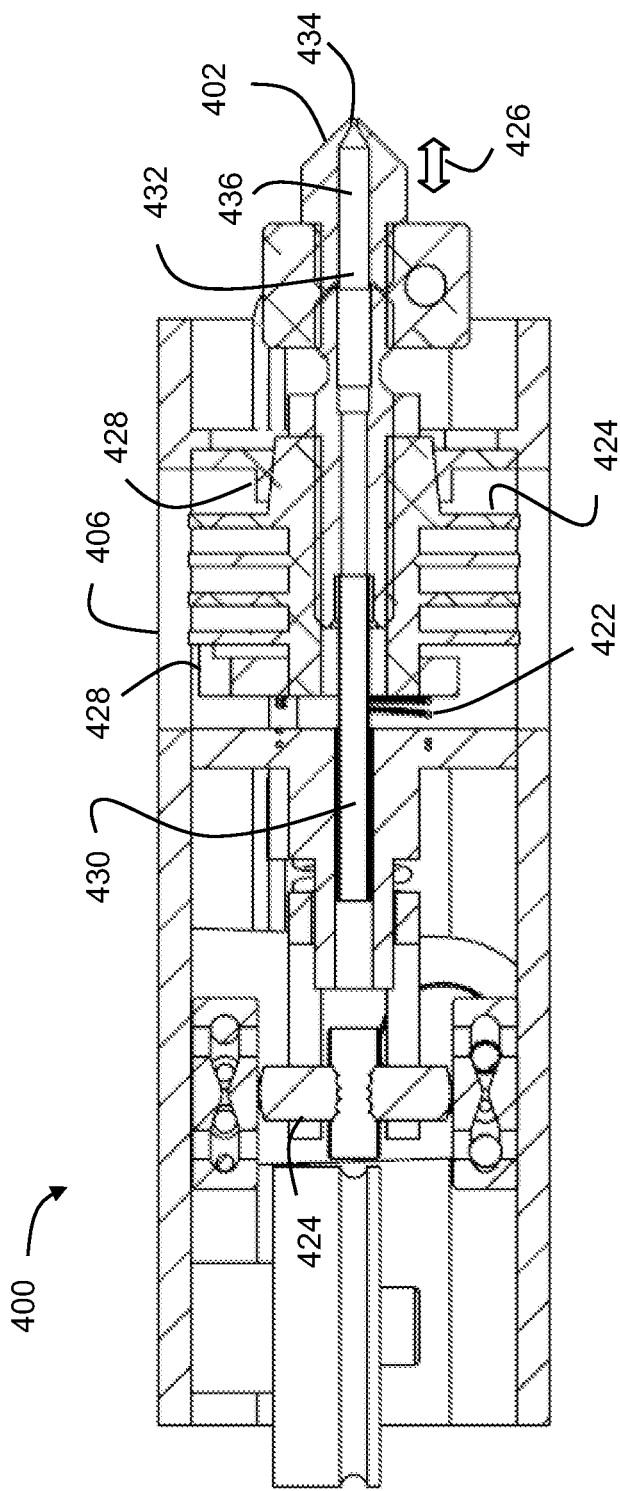
FIG. 4 shows a cross-section of an extruder.

FIG. 4 shows a cross-section of an extruder. In general, the extruder 400 may be any of the extruders described above, and may include an extrusion head 402, a housing 406, a spring 422, a drive assembly 424. The extrusion head 402 (and related components such as a heat sink 424 rigidly coupled to the extrusion head 402) may be slidably coupled to or within the housing 406 so that the extrusion head 402 can move linearly along the feedpath as generally indicated by an arrow 426. A mechanical stop 428 may be provided to limit axial motion of the extrusion head 402 along the feedpath within any desired range. More generally, one or more mechanical stops of any suitable configuration may be positioned to limit an axial travel of the extrusion head relative to the drive assembly and/or within the housing 406. It will be noted that the arrow 426 is intended to generally illustrate an axis of motion rather than a particular range of motion needed for correct operation. In practice, only a small range of motion (e.g., one millimeter or less) is necessary for proper operation as contemplated herein and any range of motion consistent with suitable performance may be delimited by the various mechanical stops 428. It will further be noted in FIG. 4 that the linear motion of the extrusion head 402 is constrained by a rigid tube 430 (with an internal bore to pass filament) extending into a cylindrical opening proximal to the drive assembly 424. However a wide range of mechanical configurations are known in the art and may be suitably adapted to constrain the extrusion head 402 to linear motion along the axis of the feedpath as contemplated herein, and all such arrangements are intended to fall within the scope of this disclosure.

In general, the extrusion head 402 may include an input 432 proximal to the drive assembly 424 and a nozzle 434 distal to the drive assembly 424 along the feedpath, with the input 432 coupled to the nozzle 434 by a chamber 436 within the extrusion head that coupled the input 432 to the nozzle 434 in fluid communication to pass liquefied build material therethrough. As generally described above, the extrusion head 402 may be moveably coupled to the drive assembly 424 to permit movement between the extrusion head 402 and the drive assembly 424 parallel to an axis of the feedpath.

Figure 5:
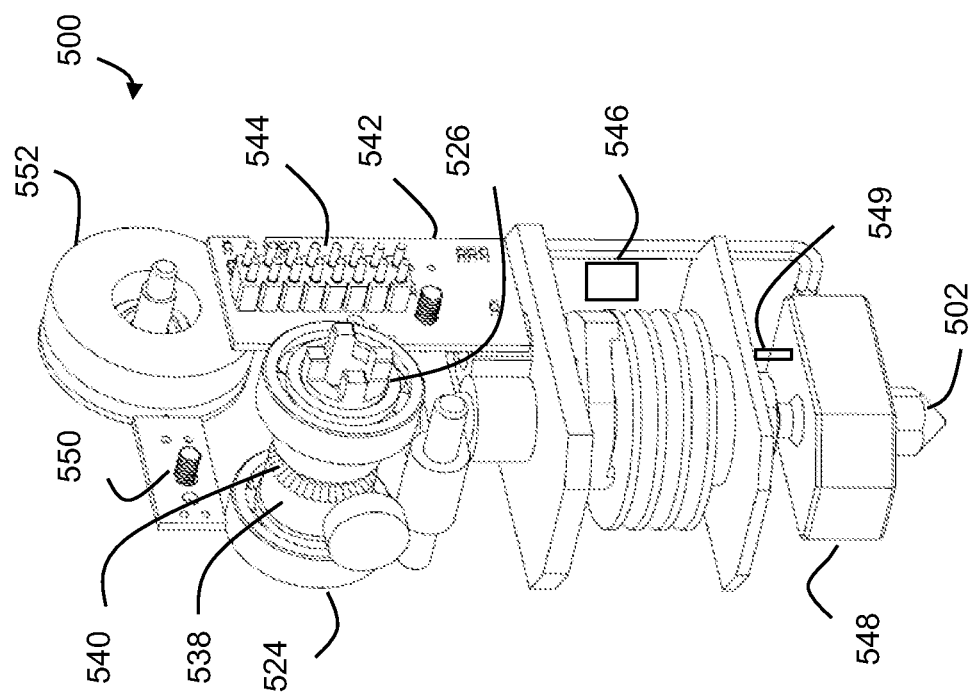
FIG. 5 shows interior components of an extruder.

FIG. 5 shows interior components of an extruder. In general, the extruder 500 may be any of the extruders described above, and may include an extrusion head 502 and a drive assembly 524 along an axis of a feedpath.

The drive assembly 524 may for example including a drive gear 538 positioned to drive a filament along a feedpath through the extruder 500, e.g., with teeth 540 that grip and propel the filament when the extruder 500 is placed for use in a three-dimensional printer and a filament fed to the drive gear 538. The drive assembly 524 may also include a coupling 526 exposed by the housing for mechanically attaching to a power source such as a stepper motor or other rotary or mechanical power source to rotate the drive gear 538 and propel filament along the feedpath. The coupling 526 may extend from the housing, or be accessible through an opening in the housing so that, when the housing is placed for use, the coupling 526 engages the power source. It will be appreciated that whatever magnetic or other couplings are used to retain the extruder 500 in an operative position in the three-dimensional printer should resist displacement by forces exerted on the housing and the extruder 500 through the coupling 526 during use. It will be understood that the term "drive assembly" is intended to be interpreted broadly, and may include any power train that delivers power to drive a filament along a feedpath, as well as any portion of such a power train that might be modularly contained within the extruder 500 or complementary portions contained within the three-dimensional printer to which the modular extruder 500 is removably and replaceably attached. All such meanings are intended to fall within the scope of this disclosure unless a more specific meaning is explicitly provided or otherwise clear from the context.

The extruder 500 may include circuitry 542, generally illustrated as a printed circuit board, and a connector 544 for coupling to a three-dimensional printer when the extruder 500 is placed for use in the three-dimensional printer. A variety of types of circuitry may be usefully included in the extruder 500. For example, the circuitry 542 may identify the extrusion head 502, e.g., by diameter, type, size, shape, serial number, etc., in a manner that can be detected by a three-dimensional printer when the extruder 500 is placed for use. This information may be provided, for example, through the connector 544, or the circuitry 542 may include a Radio Frequency Identification tag or other circuitry that can be used by the three-dimensional printer to wirelessly obtain identifying information for the extruder 500.

The extruder 500 may also or instead include a sensor 546, or any number of sensors, coupled in a communicating relationship with the circuitry 542 and/or the connector 544, to instrument the extruder 500 in any suitable manner. For example, the sensor 546 may include a Hall effect sensor or the like configured to detect a movement of the extrusion head 502 relative to the drive gear 538, or relative to any other location within or component of the extruder 500 (including the housing, which is not shown) or a three-dimensional printer to which the extruder 500 is attached. In another aspect, the sensor 546 may include a pressure sensor coupled to the extrusion head 502 and configured to detect a contact force between the extrusion head and a build platform (including, where present, an object on the build platform such as an object being fabricated). The sensor 546 may similarly include a contact switch or the like that detects contact with the build platform in a binary fashion.

In one aspect, a second spring 549 may be provided instead of or in addition to the spring described above that biases the extrusion head 502 away from the drive assembly 524, i.e., toward a surface or object facing the extrusion head 502. This spring 549 may be manually or electromechanically actuatable so that it does not counter the other spring during extrusion, and can be selectively activated during other processes. For example, this spring may be used in a build platform leveling process so that the extrusion head 502 moves against the force of a spring in a manner detectable by a Hall effect sensor (e.g., the sensor 546) when the extrusion head 502 contacts a surface.

The extruder 500 may include a heating element 548 such as a heating block with resistive heaters or the like positioned to liquefy a filament within a portion of the feedpath, such as within a region immediately prior to the extrusion head 502 along the feedpath.

The extruder may include a filament detector 550, which may include an optical beam, contact switch, or other electromechanical sensor(s) to detect the presence of a filament along the feedpath. A rotary encoder 552 of any suitable configuration may also be used, either alone or in combination with the filament detector 550 to provide diagnostic information on operation of the extruder 500. The rotary encoder 552 may be used, e.g., to detect movement of a drive motor, a drive gear, a free-wheeling roller along the filament path, or a moving filament, or some combination of these to ensure expected operation of the extruder 500. For example, a variety of diagnostic tests may be initially, continuously, or intermittently performed to ensure that the movement of a filament is consistent with a movement expected based on movement of a corresponding drive gear or stepper motor. Similarly, a Hall effect sensor or the like may be employed to ensure expected movement of the extrusion head 502 under various operating conditions. In another aspect, any of the foregoing may be used to detect when the extrusion head 502 has contacted a surface, such as by detecting a lack of vertical movement when an extrusion force is applied.

In general, a three-dimensional printer used with the extruder 500 may be any of the three-dimensional printers described above. The three-dimensional printer may include a build platform (as described for example with reference to FIG. 1) positioned to receive a build material from the extrusion head 502. The three-dimensional printer may also include a robotic system such as the x-y-z positioning assembly described above with reference to FIG. 1 (also referred to herein as an "x-y-z positioning system").

Figure 6:
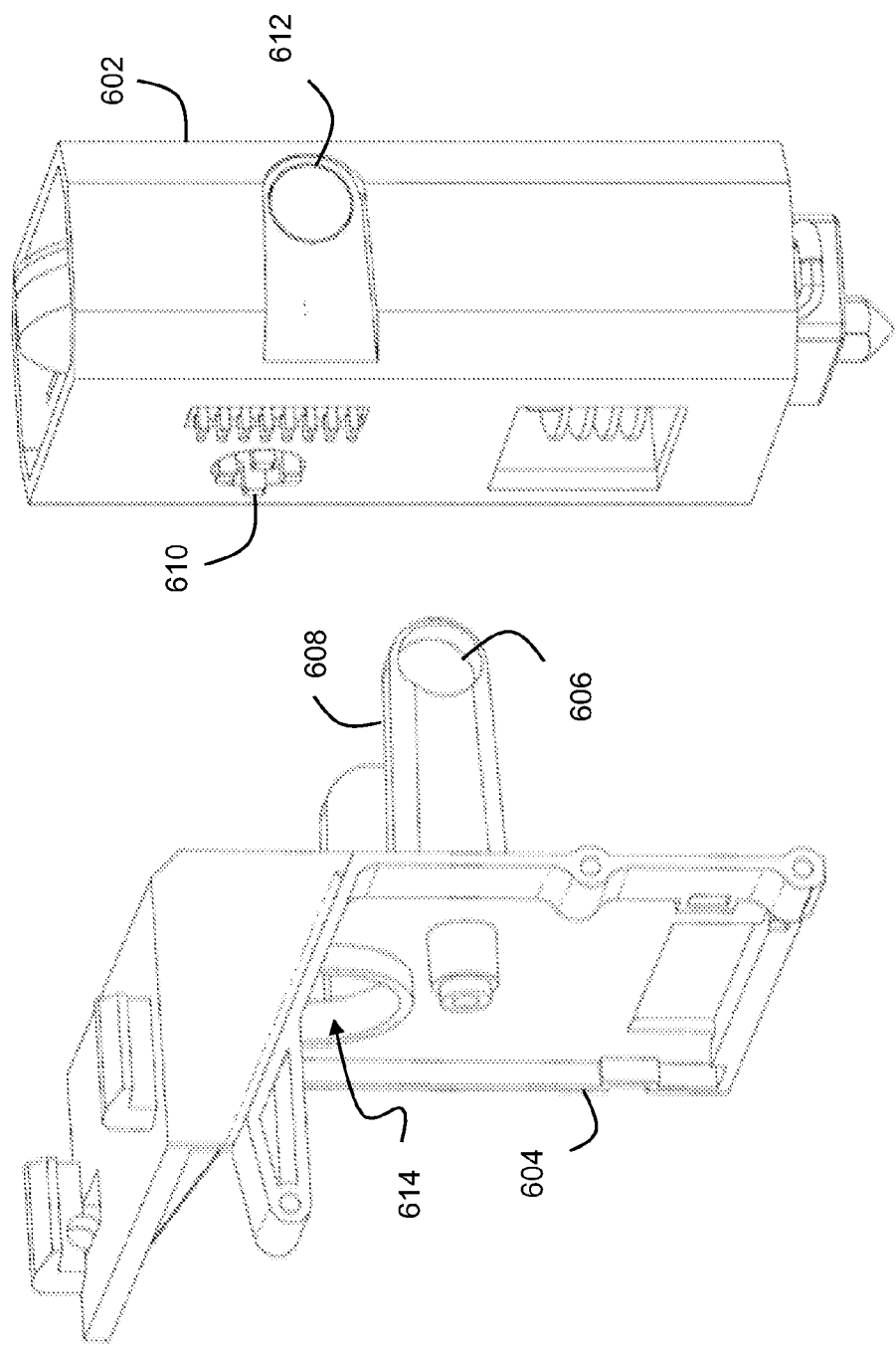
FIG. 6 shows a perspective view of an extruder and a mount.

FIG. 6 shows a perspective view of an extruder and a mount. In general the extruder 602, which may be any of the extruders described above, may be removably and replaceably coupled to a mount 604 of a robotic system of a three-dimensional printer or tool crib. The mount 604 may generally include magnetic couplings 606 in complementary positions to the magnets 612 of the extruder 602. The mount 604 may provide one or more surfaces 608 that provide horizontal shelves or other shapes to vertically support the extruder 602 so that the extruder 602 can be retained in a vertical position along a feedpath during extrusion. A portion of the drive assembly 610 may extend from the extruder 602 so that it can engage a motor or the like through an opening 614 in the mount 604.

In one aspect, the magnets 612 on the extruder 602 may be aligned to the magnetic couplings 606 of the mount 604 when the extruder 602 is placed for use in the mount 604 so that a strong magnetic force retains the extruder 602 against lateral or rotational displacement (as distinguished from an axial force along the feedpath) out of the mount 604. In another aspect, the magnets 612 may be slightly misaligned to the magnetic couplings 606 so that a weaker force retains the extruder 602 against lateral or rotational displacement out of the mount 604. In another aspect, the magnetic couplings 606 and or magnets 612 may include electro-magnets operable to provide a controllable magnetic coupling of the extruder 602 to the mount 604.

Figure 7:
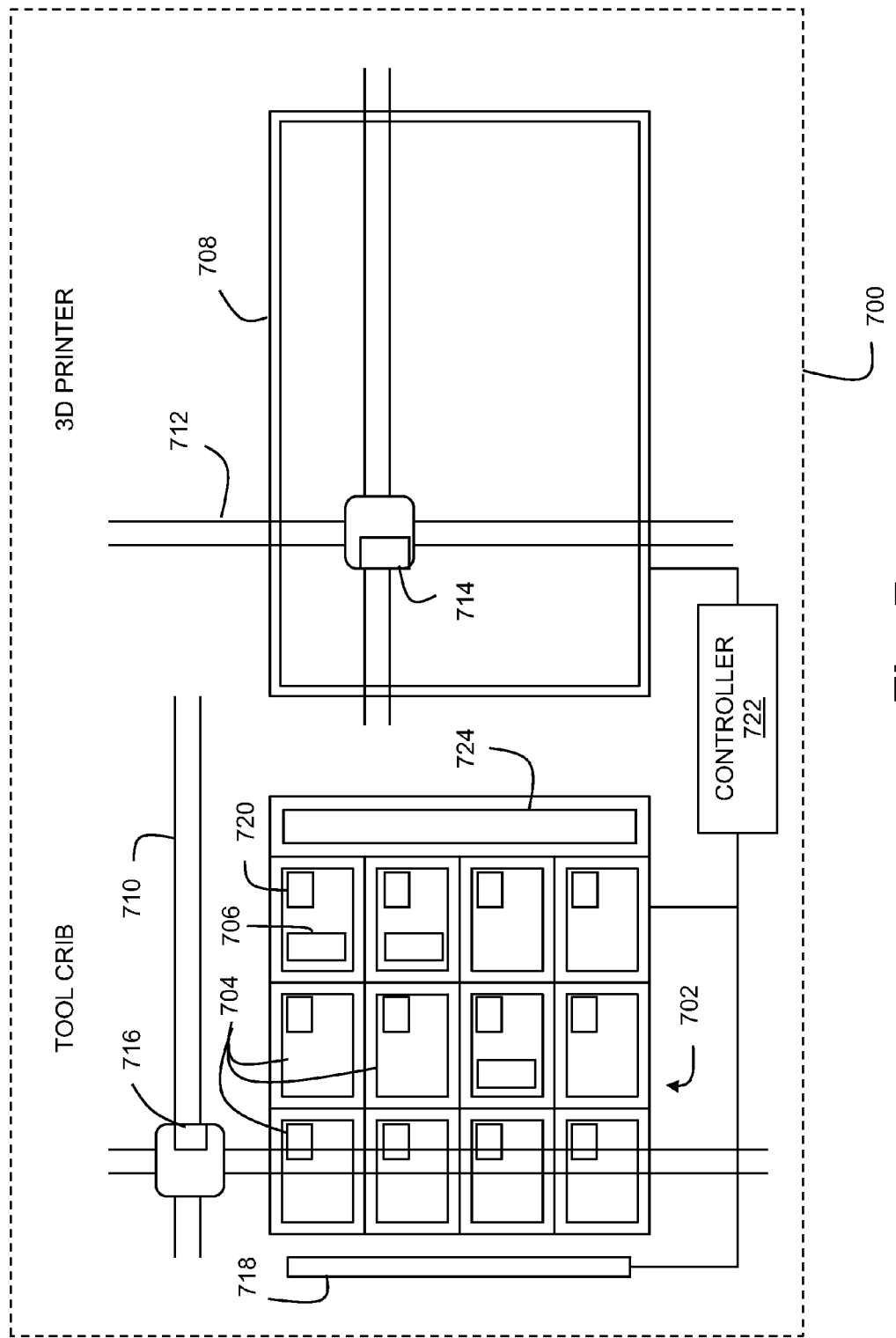
FIG. 7 shows a top view of a tool crib for a three-dimensional printer.

FIG. 7 is a top view of a tool crib system for a three-dimensional printer. In general, any modular tools, such as the extruders described above or any other tools (generally and collectively referred to below simply as "tools") that are removably and replaceably connectable to a three-dimensional printer may be stored in bins of a tool crib for managing tool inventory and interchanging tools during operation of the three-dimensional printer. The tool crib system 700 may include a tool crib 702 containing a number of bins 704 for storing tools 706. The tool crib 702 may be positioned adjacent to a build platform 708 of a three-dimensional printer, and the tool crib system 700 may include a robotic system 710 for picking and placing tools 706 in the bins 704 so that the three-dimensional printer can interchangeably use the various modular tools contained in the tool crib 702. The three-dimensional printer associated with the build platform 708 may optionally include a second robotic system 712 (such as the x-y-z positioning assembly described above) that cooperates with the robotic system 710 of the tool crib 702 to exchange tools for the three-dimensional printer, or a robotic system such as the robotic system 710 or the second robotic system 712 may be shared between the tool crib 702 and the three-dimensional printer to provide a single robotic system for the shared workspace of the tool crib 702 and printer, such as the operating envelope of an x-y-z positioning system.

The tool crib 702 may be any suitable combination of containers or other defined spaces for receiving and storing tools 706. The tool crib 702 may include doors or the like to enclose tools 706 while not in use, and may include an open bottom to receive material cleaned from or otherwise running from the tools 706 or a closed bottom, which may further contain a cleaning liquid or other fluid in which a tool 706 can be stored.

The bins 704 may generally be shaped and sized to hold tools 706 for a three-dimensional printer. The bins 704 may be various sizes and have various shapes according to whether the bins 704 are for a specific modular tool or for a variety of different tools.

The tools 706 may include any tools suitable for use with a three-dimensional printer. This may, for example, include an extruder such as any of the extruders described above. The tools 706 may include an assortment of different extruders where useful to extrude different thicknesses or shapes of material, or to extrude different types of build material. Thus, for example, the tools 706 may include two or more extruders having different extrusion diameters, different input diameters (e.g., where different diameter filaments are used), different extrusion shapes, and so forth. The tools 706 may also include a number of extruders of the same type in order to facilitate color changing, tool cleaning, error recovery (e.g., for a clogged extruder), and so forth. Other tools may also be provided, such as a camera, a milling tool, a laser cutter, a syringe, a heat or light source (e.g., for curing), a finishing tool, and so forth. While such tools 706 may have a variety of shapes, they may also advantageously have a common mechanical interface for coupling to the robotic system 710, 712 of the tool crib 702 or three-dimensional printer. One or more of the tools 706 may include one or more magnets as generally described above for handling by the robotic system.

The build platform 708 may generally be any of the build platforms or other build surfaces described above.

The robotic system 708 of the three-dimensional printer may include a mount 714 which may include any electromechanical features or configurations to removably and replaceably receive a tool 706, e.g., by coupling to a housing of the tool 706 as described above, during use by the three-dimensional printer. This may, for example, include mechanical features keyed to the tool 706, fixed or electric magnets to hold and release the tool 706, and so forth. The robotic system 710 of the tool crib 702 may include a similar or identical mount 716 to pick and place tools 706 from the tool crib, and to provide tools 706 to and receive tools 706 from the mount 714 of the robotic system 708 of the three-dimensional printer. Where a single, shared robotic system is used, a single mount may also be employed, or the single robotic system may have a number of mounts for concurrent use of multiple tools.

The mount 714 of the three-dimensional printer may be configured to position a tool 706 such as an extrusion head (when coupled to the mount 714) relative to the build platform under control of the three-dimensional printer. Thus the tool 706 may generally be moved and operated within the build volume of the three-dimensional printer using the x-y-z positioning assembly or other robotics of the three-dimensional printer. In this configuration, the robotic system 710 of the tool crib 702 may operate as a second robotic system configured to remove the tool 706 from the mount 714, and to replace the tool 706 or any other one of the tools 706 to the mount 714. Similarly the robotic system 710 of the tool crib 702 may be configured to select one of the number of tools 706 from the tool crib 702 and to couple the selected tool to the mount 714 of the three-dimensional printer. In this manner, the robots 708, 710 may affect an exchange of modular tools from the tool crib 702 for the three-dimensional printer. This exchange may advantageously be performed in or near the space between the build platform 708 and the tool crib 702 in order to reduce the travel required by each of the robotic systems 708, 710.

The tool crib system 700 may include a sensor system 718 to detect a presence of tools in the bins 704. The sensor system 718 may usefully acquire data on any relevant aspects of the tool crib system 700, the status of the bins 704, the status of tools 706 in the bins 704, and so forth. For example, the sensor system 718 may be configured to identify a type of tool in each of the bins, such as through machine vision or through radio frequency tagging or other identification circuitry on the tools 706. The sensor system 718 may also or instead provide tool status information such as a preheating status, a cleanness status, or other diagnostics, any of which may be used by the tool crib system 700 to manage and deploy tools 706 within the tool crib 702. While depicted a single component in FIG. 7, it will be appreciated that the sensor system 718 may include any number and type of individual sensors useful for gathering information about tools 706, including without limitation cameras, thermal cameras, ultrasonic sensors, infrared sensors, electromechanical sensors, radio frequency sensors, and so forth, any of which may be positioned together or separately at suitable locations throughout the tool crib system 700, including in or around the bins 604.

The tool crib system 700 may include an active element 720 to manipulate one of the tools 706 in one of the bins 704. The active element 720 may include any electromechanical devices or combination of devices useful for actively manipulating one of the tools 706. For example, the active element 720 may include a heating element that can be used, e.g., to preheat the tool 706, to clean the tool 706 such as by purging extra filament, and so forth. The active element 720 may include a tool cleaner with components such as a wiper to remove excess build material from an extruder or a nozzle and a supply of cleaning fluid to clean a milling tool. In one aspect, the tool cleaner may be configured to extrude remaining filament from within an extruder in a purge operation or the like. It will be understood that the tool crib system 700 may include any number of active elements 720 including, for example, the same type of active element 720 for each of the bins 704 or different combinations of different types of active elements 720 for different ones of the bins 704 or all of the bins 704. In this manner, the tool crib 702 may be equipped for various combinations of tools that might be used by the three-dimensional printer.

The tool crib system 700 may include a controller 722 configured to control operation of the sensor system, the active element, and the robotic system. It will be understood that the controller 722 may be a controller of a three-dimensional printer as generally described above, or a separate controller for autonomous operation of the tool crib system 700, or some combination of these. In the stand-alone tool crib configuration, the controller 722 may include an interface for communicating with a three-dimensional printer, in which case the controller 722 may provide diagnostics and status information through the interface, and receive instructions from the controller 722 for operation of the tool crib 702.

In general, the controller 722 may provide various degrees of autonomy and intelligence to a three-dimensional fabrication process. For example, the controller 722 may actively monitor and maintain an inventory of tools that can be reported to the three-dimensional printer or a separate device such as a personal computer or mobile computing device (e.g., cellular phone, tablet, laptop), or the controller 722 may simply manage a process of deterministically accepting items from a printer and storing them as directed by the printer. Similarly, the controller 722 may provide high-level programming for receiving a request for a type of tool and determining whether and where such a tool is in the tool crib so that the tool can be provide to the printer, or the controller 722 may support low-level programming, e.g., for control of individual motors and actuators by an external user such as a three-dimensional printer, or some combination of these. At the same time, the controller 722 may store information locally concerning various tools, or the controller 722 may simply provide data pass through from various sensors and actuators of the tool crib, again for use by an external resource such as a nearby three-dimensional printer. Thus a variety of techniques for advantageously incorporating a tool crib into a three-dimensional fabrication process will be readily apparent to one of ordinary skill in the art, and all such techniques that can be suitably employed for the various functions and features described herein are intended to fall within the scope of using the controller 722 as described herein unless a different meaning is explicitly provided or otherwise clear from the context.

The controller 722 and a robotic system (such as the robotic system 708 of the three-dimensional printer and/or the robotic system 710 of the tool crib 702) may be configured to pick one of the tools 706 from the tool crib 702 and present the one of the tools 706 to an adjacent three-dimensional printer, which is generally represented in FIG. 7 by the build platform 708, and may include any of the three-dimensional printers described above. The controller 722 and the robotic system may be further configured to retrieve the tool 706 from the adjacent-three-dimensional printer and place the tool 706 back in one of the bins 704 of the tool crib 702. In this manner, tools for the three-dimensional printer may be interchanged using a supply of tools in the tool crib 702, all under control of the controller 722 in cooperation with the three-dimensional printer.

As noted above, the robotic system used to exchange tools 706 between the tool crib 702 and the three-dimensional printer may include an x-y-z positioning system of the three-dimensional printer. The tool crib 702 may be positioned within an operating envelope of the x-y-z positioning system, as generally indicated by the boundary of the tool crib system

700, or the tool crib 702 may be positioned adjacent to the operating envelope of the x-y-z positioning system, with an additional robotic system 710 for the tool crib 702 to manage hand-offs between the tool crib 702 and the three-dimensional printer.

The controller 722 may in general operate the sensor system 718 and active elements 720 of the tool crib system 702 and perform related functions. For example, the controller 722 may be configured to preheat one of the tools 706 with an active element 720 such as a heating element, or to clean one of the tools 706 with a tool cleaner. Similarly, the controller 722 may be configured to scan the bins 704 to provide data to a three-dimensional printer concerning inventory and availability of tools 706 within the tool crib 702. In general, the controller 722 may respond automatically to certain requests from the printer. For example, the controller 722 may preheat a tool that requires preheating without regard to whether a request for the tool from the three-dimensional printer includes a preheat request. As another example, the controller 722 may verify that a tool 706 has been cleaned before providing the tool to the three-dimensional printer for use.

The tool crib system 700 may augment operation of a three-dimensional printer in a variety of ways. For example, where a three-dimensional printer is adjacent to the tool crib 702, the three-dimensional printer may be configured to detect a failure of an extruder (e.g., resulting from a clog, leak, failure to heat up, or other malfunction). The three-dimensional printer may then be further configured to replace the extruder with a second extruder from the tool crib 702, e.g., by issuing a tool change instruction or the like to the controller 722.

The tool crib system 700 may include a purge bin 724 separate from the other bins 704 to receive extruded filament from the extruder. Where the tool crib 702 is within the operating envelope of the robotic system 708 for the three-dimensional printer, the printer may simply move to a position over the purge bin 724 and advance build material until the extruder is empty. The printer may also extrude a second build material to purge an interior of the extruder, which second build material may be soluble or otherwise removable from the extruder prior to use of the extruder with a new build material.

FIG. 8 shows a method for operating a tool crib. The tool crib, which may be any of the tool cribs described above, may include a number of tools in a number of bins for use in cooperation with a three-dimensional printer.

As shown in step 802, the method 800 may include receiving a tool change request. The request may be initiated under a variety of conditions. For example, the request may be initiated by a three-dimensional printer due to a change in build material or a new task identified in fabrication instructions being executed by the three-dimensional printer. In another aspect, the request may be initiated in response to an error condition detected by the three-dimensional printer, such as a clogged extruder, a heating failure, or other error condition. However originated, the request may be received at a controller for a tool crib, which may initiate responsive action.

As shown in step 804, the method 800 may include receiving a first tool from the three-dimensional printer. This may be an extruder such as any of the extruders described above, or any other suitable tool such as a camera, milling tool, cleaning tool, measuring tool, finishing tool, and so forth. This may include operating a robotic system to retrieve the first tool from a mount (e.g., a mount with magnetic couplings for the first tool) on the three-dimensional printer as generally contemplated above. This may also or instead include managing a hand off of the first tool from a robotic system of the three-dimensional printer to a second robotic system of the tool crib. The tool may be placed in a bin of the tool crib using the robotic system(s), or positioned in an intermediate location for handling such as cleaning, inspection, and the like.

As described above, this step may use a robotic system of the three-dimensional printer, a robotic system of the tool crib, or some combination of these. For example, this may include retrieving the first tool from a build volume of the three-dimensional printer with a robotic system of the tool crib, or passing the first tool into an operating envelope of the tool crib for a hand off to a robotic system of the tool crib.

As shown in step 806, the method 800 may include cleaning the first tool. This may include a variety of cleaning steps such as disposing the first tool or portions thereof in a cleaning solving, or heating the first tool to a high temperature to liquefy or vaporize contaminants. This may also or instead include extruding build material from the first tool using any suitable techniques, which may include displacing the build material with a cleaning material under pressure. In certain applications, cleaning the tool may also include sterilizing the tool, coating the tool, or otherwise treating the tool for an intended use.

As shown in step 808, the method 800 may include receiving a request from the three-dimensional printer for a second tool. This may, for example, include a request based upon the state of a build, such as where a new build material is to be used or where a finishing step is required, or this may be a request based upon a detected failure of a current tool in the three-dimensional printer, or for any other reason. Regardless of the reason, the tool crib controller may respond with appropriate action to identify or prepare an appropriate tool.

As shown in step 810, the method 800 may include preheating the second tool for use in an extrusion process. This may, for example, include preheating the second tool to an extrusion temperature applied by the three-dimensional printer. In one aspect, a preheat temperature may be provided by the three-dimensional printer with a tool request. In another aspect, the tool crib may automatically determine a preheat temperature based upon, e.g., a type of the tool or externally provided information concerning a type of build material. It will be appreciated that preheating is only an example of a preparatory step, and that any other suitable process such as cooling, cleaning, lubricating, or so forth may also or instead be performed in order to ready the second tool for use by the three-dimensional printer.

As shown in step 812, the method 800 may include presenting the second tool to the three-dimensional printer. This may include moving the second tool into a build volume of the three-dimensional printer with a robotic system of the tool crib, with a robotic system of the three-dimensional printer, or some combination of these. The tool crib may also include a locking mechanism that secures tools in a locked state when not in use, and the step of presenting such a tool may include releasing the second tool from a locked state within the tool crib for retrieval by a robotic system of the three-dimensional printer, such as be releasing a latch or deactivating an electromechanical coupling.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

It should further be appreciated that the methods above are provided by way of example. Absent an explicit indication to the contrary, the disclosed steps may be modified, supplemented, omitted, and/or re-ordered without departing from the scope of this disclosure.

The method steps of the invention(s) described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user or a remote processing resource (e.g., a server or cloud computer) to perform the step of X. Similarly, performing steps X, Y and Z may include any method of directing or controlling any combination of such other individuals or resources to perform steps X, Y and Z to obtain the benefit of such steps.

While particular embodiments of the present invention have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A device comprising:
   a housing configured to removably and replaceably couple to a three-dimensional printer in a predetermined alignment to a drive assembly of the three-dimensional printer and an axis of a feedpath for a filament of build material driven by the drive assembly; and
   an extrusion head including an input proximal to the drive assembly along the feedpath when the housing is placed for use in the three-dimensional printer and a nozzle distal to the drive assembly along the feedpath, the input coupled to the nozzle by a chamber within the extrusion head, the extrusion head moveably coupled to the housing to permit movement of the extrusion head within the housing parallel to an axis of the feedpath.

2. The device of claim 1 further comprising a spring coupled to the extrusion head and biasing the extrusion head toward the drive assembly when the housing is placed for use in the three-dimensional printer.

3. The device of claim 1 further comprising a spring coupled between the extrusion head and the drive assembly, the spring biasing the extrusion head away from the drive assembly with a predetermined spring force.

4. A device comprising:
   an extrusion head for use in a three-dimensional printer, the extrusion head including an axis aligned to a feedpath of the three-dimensional printer when placed for use in the three-dimensional printer;
   a housing about the extrusion head, the housing having a surface configured to support the extrusion head against displacement along the axis under a force applied by a build material along the feedpath when the housing is placed into a complementary surface of the three-dimensional printer; and
   one or more magnets disposed on a vertical surface of the housing and positioned to magnetically couple to a corresponding vertical wall of the three-dimensional printer to resist rotational displacement of the housing when placed in the three-dimensional printer.

5. The device of claim 4 wherein the extrusion head is movably coupled to the housing to permit linear movement of the extrusion head parallel to the axis within the housing.

6. The device of claim 5 further comprising a spring having a predetermined spring force coupling the extrusion head to the housing.

7. The device of claim 6 wherein the predetermined spring force is less than a force applied by a filament to the extrusion head to extrude the filament from the extrusion head.

8. The device of claim 6 wherein the spring includes a coil spring.

9. The device of claim 6 wherein the spring is a coil spring wound about the axis of the feedpath.

10. The device of claim 6 further comprising a heating element positioned to liquefy a filament within a portion of the feedpath.

11. The device of claim 6 wherein the spring is responsive to an applied force of a filament from a drive gear of the three-dimensional printer to move the extrusion head along the axis into an extruding position.

12. The device of claim 11 wherein the spring is responsive to a removal of the applied force of the filament from the drive gear to move along the axis into a retracted position.

13. The device of claim 6 wherein the predetermined spring force retains the extrusion head proximal to a drive gear of the three-dimensional printer in the absence of an applied force from a filament driven by the drive gear, and wherein the predetermined spring force permits that extrusion head to move away from the drive gear when the applied force exceeds a predetermined threshold.

14. The device of claim 13 wherein the predetermined threshold is less than a force required to extrude the filament through the nozzle of the extrusion head.

15. The device of claim 14 further comprising a sensor configured to detect a movement of the extrusion head relative to a component of the three-dimensional printer.

16. The device of claim 15 wherein the sensor includes a Hall effect sensor.

17. The device of claim 4 further comprising circuitry to identify the extrusion head.

18. The device of claim 17 wherein the circuitry includes a Radio Frequency Identification tag.

19. The device of claim 4 wherein the housing is removably and replaceably coupled to the three-dimensional printer.

20. The device of claim 19 wherein the three-dimensional printer includes a robotic system and a build platform, the robotic system including a mount configured to removably and replaceably receive the housing and further configured to position the extrusion head, when coupled to the mount, relative to the build platform.

21. The device of claim 20 wherein the extrusion head includes a pressure sensor configured to detect a contact force between the extrusion head and the build platform.

22. The device of claim 20 further comprising a second robotic system configured to remove the device from the mount and replace the device to the mount.

23. The device of claim 22 further comprising a tool crib including a number of bins to store a corresponding number of tools for the three-dimensional printer, wherein the second robotic system is configured to select one of the number of tools and couple the one of the number of tools to the mount of the three-dimensional printer.

\* \* \* \* \*